United States Patent
Labrie et al.

(10) Patent No.: US 9,869,403 B2
(45) Date of Patent: Jan. 16, 2018

(54) VALVE HAVING PRESSURE-RELIEVING VENT PASSAGE

(75) Inventors: Jason Labrie, Southampton, MA (US); Kevin Arthur Roberg, Norwich, CT (US); Christopher McAuliffe, Windsor, CT (US); Donald E. Army, Enfield, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 608 days.

(21) Appl. No.: 13/103,589

(22) Filed: May 9, 2011

(65) Prior Publication Data

US 2012/0286181 A1   Nov. 15, 2012

(51) Int. Cl.
*F16K 23/00* (2006.01)
*F16K 24/02* (2006.01)
*F16K 41/02* (2006.01)

(52) U.S. Cl.
CPC .............. *F16K 24/02* (2013.01); *F16K 41/02* (2013.01)

(58) Field of Classification Search
CPC ...................................... F16K 24/02
USPC ........................................ 137/312
See application file for complete search history.

(56) References Cited

U.S. PATENT DOCUMENTS

| | | | |
|---|---|---|---|
| 3,354,897 A * | 11/1967 | Koch et al. | 137/312 |
| 3,379,405 A * | 4/1968 | Natho | 251/31 |
| 3,886,969 A | 6/1975 | Shira et al. | |
| 4,373,544 A | 2/1983 | Goodman et al. | |
| 4,617,958 A | 10/1986 | Seidel et al. | |
| 4,926,908 A | 5/1990 | Dschida | |
| 5,024,416 A | 6/1991 | Cohen | |
| 5,203,370 A * | 4/1993 | Block et al. | 137/312 |
| 5,269,339 A * | 12/1993 | Szatmary | 137/315.26 |
| 6,068,238 A | 5/2000 | Frank et al. | |
| 6,572,074 B2 | 6/2003 | Yang et al. | |
| 7,121,523 B2 * | 10/2006 | Adams et al. | 251/119 |
| 7,159,614 B2 | 1/2007 | Tiziani et al. | |
| 7,610,928 B2 | 11/2009 | Feldman et al. | |
| 2001/0028050 A1 | 10/2001 | Newberg | |
| 2003/0070711 A1 * | 4/2003 | Bowman et al. | 137/312 |

FOREIGN PATENT DOCUMENTS

| | | |
|---|---|---|
| EP | 1504045 | 3/1978 |
| GB | 2117496 | 10/1983 |
| JP | 2009283330 | 12/2009 |
| JP | 2010121703 | 6/2010 |
| WO | 0020764 | 4/2000 |

OTHER PUBLICATIONS

French Search Report for French Patent Application No. 1254101 dated Dec. 18, 2015.

* cited by examiner

*Primary Examiner* — Reinaldo Sanchez-Medina
(74) *Attorney, Agent, or Firm* — Carlson, Gaskey & Olds, P.C.

(57) ABSTRACT

A valve includes a valve housing having an interior chamber and an actuator housing in which an actuator is disposed. The actuator housing is secured with the valve housing. A shaft is coupled with a valve member and the actuator and extends within a bore between the interior chamber of the valve housing and the actuator. The valve includes at least one vent passage that has a first end that opens to the bore and a second end that opens to an exterior of the valve housing and actuator housing.

4 Claims, 1 Drawing Sheet

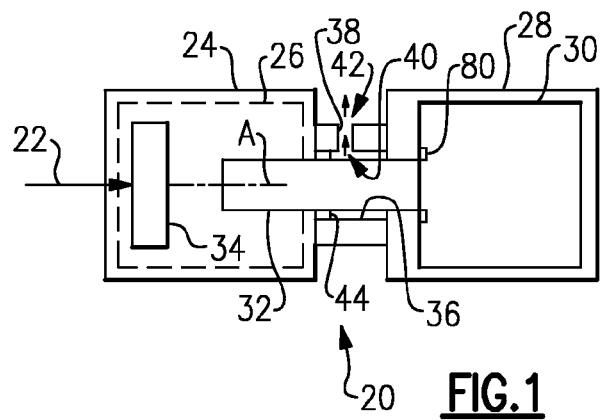
FIG.1
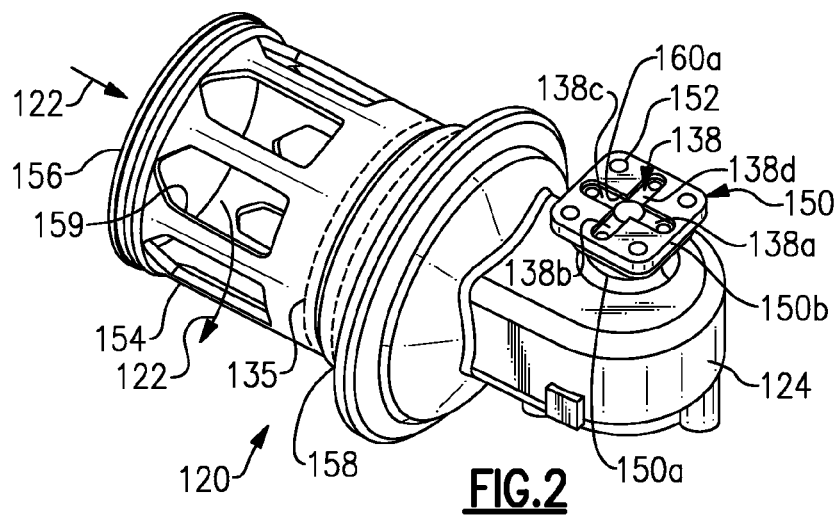
FIG.2
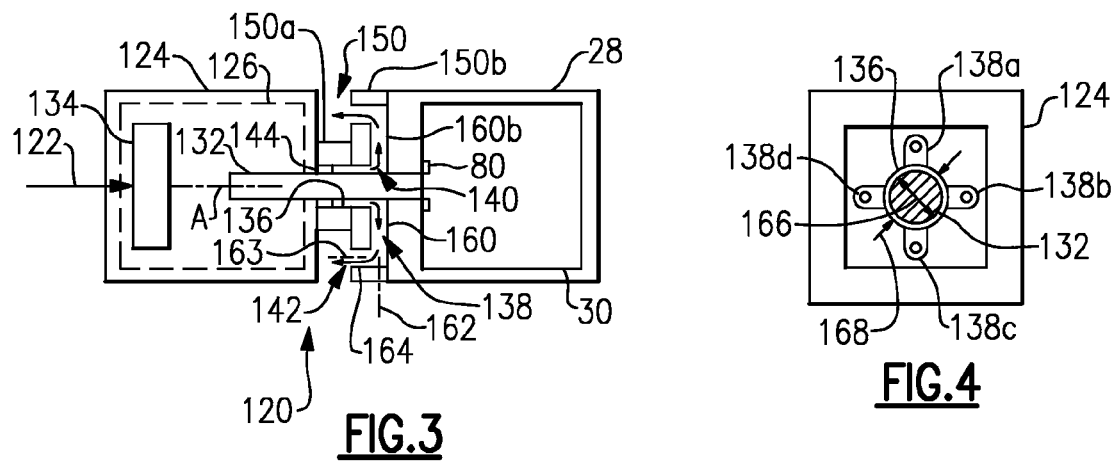
FIG.3
FIG.4

VALVE HAVING PRESSURE-RELIEVING VENT PASSAGE

BACKGROUND

This disclosure relates to actuator-driven valves. Actuator-driven valves are known and used to control flow of a fluid, such as a pressurized fluid, in a flow passage. The actuator-driven valve may be designed to isolate the actuator from the pressurized fluid. To that end, the actuator-driven valve may include one or more seals between the actuator and the valve components to limit flow of the pressurized fluid from the valve components into the actuator.

SUMMARY

Disclosed is a valve that includes a valve housing with an interior chamber and an actuator housing that contains an actuator. The actuator housing is secured with the valve housing. A shaft is coupled with a valve member and the actuator and extends within a bore between the interior chamber of the valve housing and the actuator. The valve includes at least one vent passage that has a first end that opens to the bore and a second end that opens to an exterior of the valve housing and actuator housing. The vent passage allows any fluid that escapes through the bore to vent rather than enter the actuator.

In another aspect, a valve includes a valve housing having an interior chamber and a mount portion, a valve member, and a shaft coupled with the valve member. The shaft extends from the interior chamber and through a bore in the mount portion. At least one vent passage extends through the mount portion and includes a first end that that opens to the bore and a second end that opens to an exterior of the valve housing.

Also disclosed is a method of establishing a pressure-relieving vent for a valve. The method includes securing a mount portion of the valve housing with the actuator housing such that a shaft coupled with the valve member and the actuator extends from the interior chamber through a bore in the mount portion. The securing establishes at least one vent passage between the actuator and the interior chamber of the valve housing.

BRIEF DESCRIPTION OF THE DRAWINGS

The various features and advantages of the disclosed examples will become apparent to those skilled in the art from the following detailed description. The drawings that accompany the detailed description can be briefly described as follows.

FIG. 1 shows an example valve that has a vent passage.

FIG. 2 shows a perspective view of another valve having a plurality of vent passages.

FIG. 3 shows a cross-section of a portion of the valve shown in FIG. 2.

FIG. 4 shows an axial view of a portion of the valve shown in FIG. 2.

DETAILED DESCRIPTION

FIG. 1 schematically illustrates selected portions of an example valve 20 that is operational to control flow of a pressurized fluid 22. For example, the valve 20 may be used in a gas turbine engine to control flow of pressurized air between different areas of the engine. It is to be understood that the valve 20 may alternatively be used in other systems that would benefit from this disclosure.

The valve 20 includes a valve housing 24 that generally surrounds an interior chamber 26. An actuator housing 28 is secured with the valve housing 24 using mechanical fasteners, welding, or the like. The actuator housing 28 contains an actuator 30 that is coupled through a shaft 32 with a valve member 34. The valve member 34 may be a piston or other type of valve member that the actuator 30 drives, through the shaft 32, to control the flow of the pressurized fluid 22. The valve 20 may be a turbine bypass valve and/or temperature control valve to control the flow of humid air as the pressurized fluid 22, which may condense inside the valve 20.

The shaft 32 extends within a bore 36 between the interior chamber 26 of the valve housing 24 and the actuator 30. At least one vent passage 38 (hereafter "vent passage 38" is used to refer to one or more vent passages) includes a first end 40 that opens to the bore 36 and a second end 42 that opens to an exterior of the valve housing 24 and the actuator housing 28. The vent passage 38 has a minimum cross-sectional area that is greater than or equal to a clearance area between the shaft 32 and the bore 36. The securing of the valve housing 24 with the actuator housing 28 establishes or locates the vent passage 38 between the actuator 30 and the interior chamber 26 of the valve housing 24.

In operation of the valve 20, the actuator 30 is selectively activated to rotate the shaft 32 and in turn move the valve member 34 between open and closed positions to control the flow of the pressurized fluid 22. The valve member 34 may be directly coupled with the shaft 32 or coupled by way of a linkage (not shown) to the shaft 32.

At least a portion of the pressurized fluid 22 may enter into the interior chamber 26 of the valve housing 24. A first seal 44 may be provided between the interior chamber 26 and the actuator housing 28, to limit flow of the pressurized fluid 22 through the bore 36 into the actuator housing 28. In the illustrated example, the first seal is between the bore 36 and the shaft 32. The pressurized fluid 22 in the interior chamber 26 may escape past the first seal 44 and flow through the bore 36 toward the actuator housing 28. The pressurized fluid 22 may carry moisture or debris that, if allowed to flow into the actuator housing 28, could cause the actuator 30 to malfunction. In this regard, the valve 20 is designed to isolate the interior chamber 26 of the valve housing 24 from the actuator housing 28 and actuator 30. The vent passage 38 intercepts any escaped pressurized fluid 22 and vents the pressurized fluid 22 to the exterior of the valve housing 24 and actuator housing 28. Thus, flow of the pressurized fluid 22 into the actuator housing 28 is reduced or eliminated.

Using a size of the vent passage 38 that is equal to or greater than the clearance area between the shaft 32 and the bore 36 provides unrestricted flow of any of the pressurized fluid 22 that may escape between the shaft 32 and the bore 36. If there is no first seal 44 or if the seal completely wears away, the maximum amount of flow of pressurized fluid 22 from the interior chamber 26 would be increase as the pressure of the fluid increases and/or the clearance area between the shaft 32 and the bore 36 increases. By sizing the minimum cross-sectional area of the vent passage 38 to be greater than or equal to the clearance area, the vent passage 38 does not restrict the venting of the pressurized fluid 22. Thus, all of the fluid that could possibly escape from the interior chamber 26 can vent rather than flow into the actuator housing 28.

The minimum cross-sectional area of the vent passage 38 may also be selected to control a pressure differential across a second seal 80 in the actuator 30 to be below a predetermined threshold pressure. For instance, the shaft 32 may be supported in the actuator 30 on a bearing. The bearing may include grease that is used as the second seal 80. If the pressurized fluid 22 escapes from the interior chamber 26 into the actuator housing 28, and the pressure of the pressurized fluid 22 is too high, the pressurized fluid 22 may breach the second seal 80 and cause the actuator 30 to malfunction. By selecting a proper minimum cross-sectional area of the vent passage 38 between the first seal 44 and the second seal 80, the pressure differential across the second seal 80 can be maintained below a predetermined threshold pressure to prevent breaching the second seal 80. Certain conditions are used for calculating the minimum cross-sectional area of the vent passage 38 for maintaining a maximum pressure differential across the seal 80. These conditions include the pressure and temperature of the fluid 22 inside the valve housing 24, pressure surrounding the valve housing 24 and actuator housing 28, effective area between the shaft 32 and the bore 36, and various fluid properties of the pressurized fluid 22 inside the valve housing 24. In one example, the pressure differential may be maintained to be 0.1 psi (0.00068 MPa) or lower.

FIG. 2 shows a perspective view of another embodiment of a valve 120. FIG. 3 shows a schematic cross-sectional view of the valve 120 of FIG. 2. In this disclosure, like reference numerals designate like elements where appropriate, and reference numerals with the addition of one-hundred or multiples thereof designate modified elements. The modified elements are understood to incorporate the same features and benefits of the corresponding original elements. For the purpose of describing the arrangement and viewing the vent passage 138, the actuator 30 and actuator housing 28 are not shown in FIG. 2.

In the illustrated example, the valve 120 includes a valve housing 124 that has an interior chamber 126 and a mount portion, flange 150, to which the actuator housing 28 is secured. In this example, the flange 150 is a protrusion from the valve housing 124 that includes openings 152 for receiving fasteners to secure the actuator housing 28. The flange 150 includes a shank 150a and a head 150b that is larger than the shank 150a in a dimension that is perpendicular to the axis A of the shaft 132.

The shaft 132 is coupled with the actuator 30 and a valve member 134 for controlling flow of a pressurized fluid 122. In this example, the valve member 134 is a piston 135 that translates within a portion 154 of the valve housing 124 to control the flow. For example, when the piston 135 is moved to the end 156 of the portion 154, the valve 120 is closed. When the piston 135 is retracted toward the end 158 of the portion 154, flow is permitted through windows 159 in the portion 154.

At least one vent passage 138 (hereafter "vent passage 138") extends within the flange 150. The vent passage 138 includes a first end 140 that opens to a bore 136, through which the shaft 132 extends. The vent passage 138 includes a second end 142 that opens to an exterior of the valve housing 124 and the actuator housing 28. Similar to the example shown in FIG. 1, a first seal 144 may be provided between the valve housing 124 and the actuator housing 28 to limit or prevent flow of the pressurized fluid 122 from the interior chamber 126, through the bore 136, toward the actuator housing 28. The securing of the mount portion of the valve housing 124 with the actuator housing 28 establishes or locates the vent passage 138 between the actuator 30 and the interior chamber 126 of the valve housing 124.

As shown in FIG. 2, the vent passage 138 includes a plurality of vent passages 138a, 138b, 138c and 138d. It is to be understood that in other examples the valve 120 may include fewer than 4 or more than 4 of the vent passages 138.

Each of the plurality of vent passages 138a-d includes a first section 160 that extends along a central axis 162 that is perpendicular to the central axis A of the shaft 132. In the illustrated example, the first section 160 extends within the head 150b of the flange 150 such that the flange 150 defines the first section 160 on three sides 160a, with an open side 160b on the face of the flange 150. When the actuator housing 28 is secured to the face of the flange 150, the actuator housing 28 closes the open side 160b of the first section 160 and defines the fourth side of the first section 160. The actuator housing 28 thereby partially defines the vent passages 138a-d. The first section 160 includes the first end 140 of the respective vent passage 138a-d.

A second section 164 of the respective vent passage 138 extends transversely to the first section 160 and includes the second end 142. That is, the central axis 163 along which the second section 164 extends is at a non-parallel angle to the axis 162 of the first section 160 such that the respective passage 138a-d extends along a non-straight path and directs the vented pressurized fluid 122 in a direction toward the exterior surface of valve housing 124. The venting of the pressurized fluid 122 in a direction toward the valve housing 124 facilitates dissipation of the pressure of the pressurized fluid 122 and prevents the pressurized fluid 122 from directly impinging upon any neighboring components of the valve 120.

In the illustrated embodiment, each respective first section 160 and second section 164 has a minimum cross-sectional area. In embodiments, the minimum cross-sectional area of the second section 164 is greater than or equal to the minimum cross-sectional area of the first section 160. That is, a ratio of the minimum cross-sectional area of the second section 164 to the minimum cross-sectional area of the first section 160 is equal to or greater than 1. Such a ratio permits unrestricted flow through the respective vent passages 138a-d.

FIG. 4 shows an axial view along axis A of the shaft 132. The shaft 132 has an outer diameter 166 and the bore 136 has an inner diameter 168. There is a clearance between the shaft 132 and the bore 136. The area of the clearance may be calculated in a known manner from the diameters 166 and 168. The combined minimum cross-sectional areas of the vent passage 138a-d is equal to or greater than the clearance area between the shaft 132 and the bore 136.

Similar to the example described in FIG. 1, using a size of the vent passages 138a-d that is equal to or greater than the clearance area between the shaft 132 and the bore 136 provides unrestricted flow of any of the pressurized fluid 122 that may escape between the shaft 132 and the bore 136. Also, the combined minimum cross-sectional area of the vent passages 138a-d may also be selected to control a pressure differential across the second seal 80 in the actuator 30 to be below a predetermined threshold pressure, as previously described.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A valve comprising:
    a valve housing including an interior chamber;
    an actuator housing secured with the valve housing;
    an actuator within the actuator housing;
    a valve member;
    a shaft coupled with the valve member and the actuator, the shaft extending within a bore between the interior chamber of the valve housing and the actuator; and
    at least one vent passage including a first end that opens to the bore and a second end that opens to an exterior of the valve housing and the actuator housing, the valve housing including a flange and the at least one vent passage extending within the flange, the flange including a shank and a head that is larger than the shank in a dimension that is perpendicular to the axis of the shaft, and the at least one vent passage extends within the head such that the head defines sides of the at least one vent passage and an open side of the at least one vent passage.

2. The valve as recited in claim 1, wherein the actuator housing is secured to the head of the flange to close the open side of the at least one vent passage and partially define the at least one vent passage.

3. A valve comprising:
    a valve housing including an interior chamber;
    an actuator housing secured with the valve housing;
    an actuator within the actuator housing;
    a valve member;
    a shaft coupled with the valve member and the actuator, the shaft extending within a bore between the interior chamber of the valve housing and the actuator; and
    at least one vent passage including a first end that opens to the bore and a second end that opens to an exterior of the valve housing and the actuator housing, wherein the actuator housing partially defines the at least one vent passage.

4. A valve comprising:
    a valve housing including an interior chamber and a mount portion;
    a valve member;
    a shaft coupled with the valve member, the shaft extending from the interior chamber and through a bore in the mount portion; and
    at least one vent passage extending through the mount portion and including a first end that that opens to the bore and a second end that opens to an exterior of the valve housing, wherein the mount portion includes a flange comprising a shank and a head that is larger than the shank in a dimension that is perpendicular to the axis of the shaft, and the at least one vent passage extends within the head such that the head defines sides of the at least one vent passage and an open side of the at least one vent passage.

* * * * *